United States Patent [19]

McElhoe et al.

[11] 4,031,915

[45] June 28, 1977

[54] IRRIGATION SYSTEM FLUSHING VALVE

[75] Inventors: Bruce A. McElhoe, Waialua; Joseph G. Tabrah, Kahuku, both of Hawaii

[73] Assignee: Hawaiian Sugar Planters' Association, Honolulu, Hawaii

[22] Filed: June 12, 1975

[21] Appl. No.: 586,213

Related U.S. Application Data

[62] Division of Ser. No. 522,912, Nov. 11, 1974, Pat. No. 3,921,905.

[52] U.S. Cl. .............................. 137/529; 137/843; 251/63
[51] Int. Cl.² ........................................ F16K 15/14
[58] Field of Search ............ 251/63, 61.1; 137/525, 137/528, 529, 538, 843, 859

[56] References Cited

UNITED STATES PATENTS

| | | | |
|---|---|---|---|
| 2,886,281 | 5/1959 | Canalizo | 251/61.1 X |
| 3,260,275 | 7/1966 | Armstrong et al. | 251/63 X |
| 3,315,696 | 4/1967 | Hunter | 137/525 X |
| 3,476,142 | 11/1969 | Schultz | 137/525 X |
| 3,502,297 | 3/1970 | Wardrup | 251/61.1 |
| 3,659,625 | 5/1972 | Colnel et al. | 251/61.1 X |

*Primary Examiner*—William R. Cline
*Attorney, Agent, or Firm*—Burns, Doane, Swecker & Mathis

[57] ABSTRACT

A soil irrigating system includes a plurality of drip tubes communicating with a supply of pressurized water to dispense a substantially continuous flow of water to the soil. Flushing valves are connected to remote ends of the drip tubes to periodically flush the tubes clean. Each flushing valve comprises an inlet communicating with a drip tube, an outlet for discharging water from the drip tube, a pilot opening arranged to introduce pressurized pilot water to the valve, and a valve element of resiliently deformable material. The valve element has a recessed configuration suitable for enabling the valve element to extend longitudinally forwardly and radially outwardly into a sealing posture in response to urgings of pressurized pilot water at the pilot opening, to prevent discharge of water from the remote end of the associated drip tube. When water pressure at the pilot opening is relieved, water pressure from the drip tube shifts the valve element to an open position to enable water to be flushed from the drip tubes. A valved manifold is provided to conduct pressurized liquid to the pilot openings to simultaneously shift the valve elements to their closed positions to prevent flushing of the drip tubes. The valve manifold is also able to relieve liquid pressure at the pilot openings so that the valve elements are simultaneously shifted to their open position by water pressure from the drip tubes, to permit flushing of the drip tubes.

3 Claims, 5 Drawing Figures

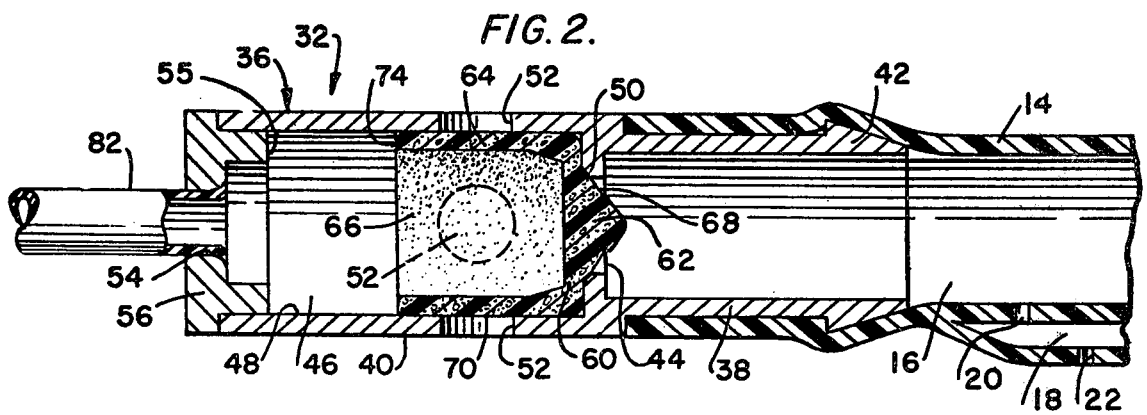
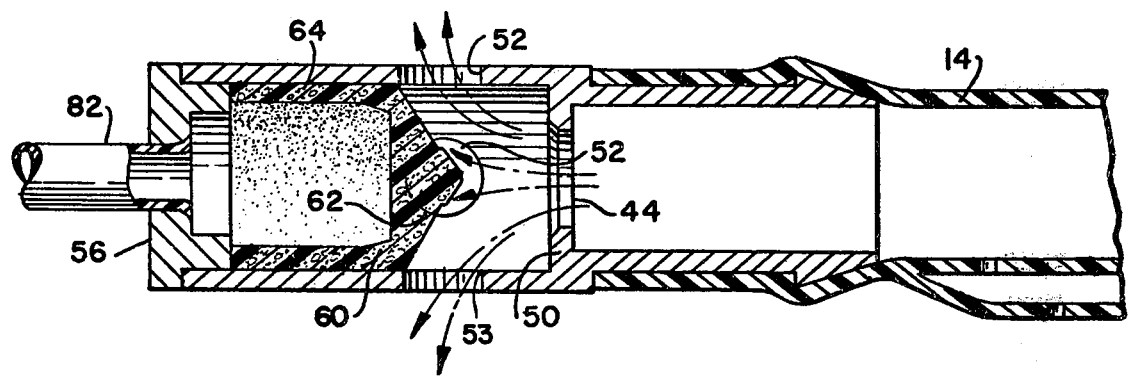
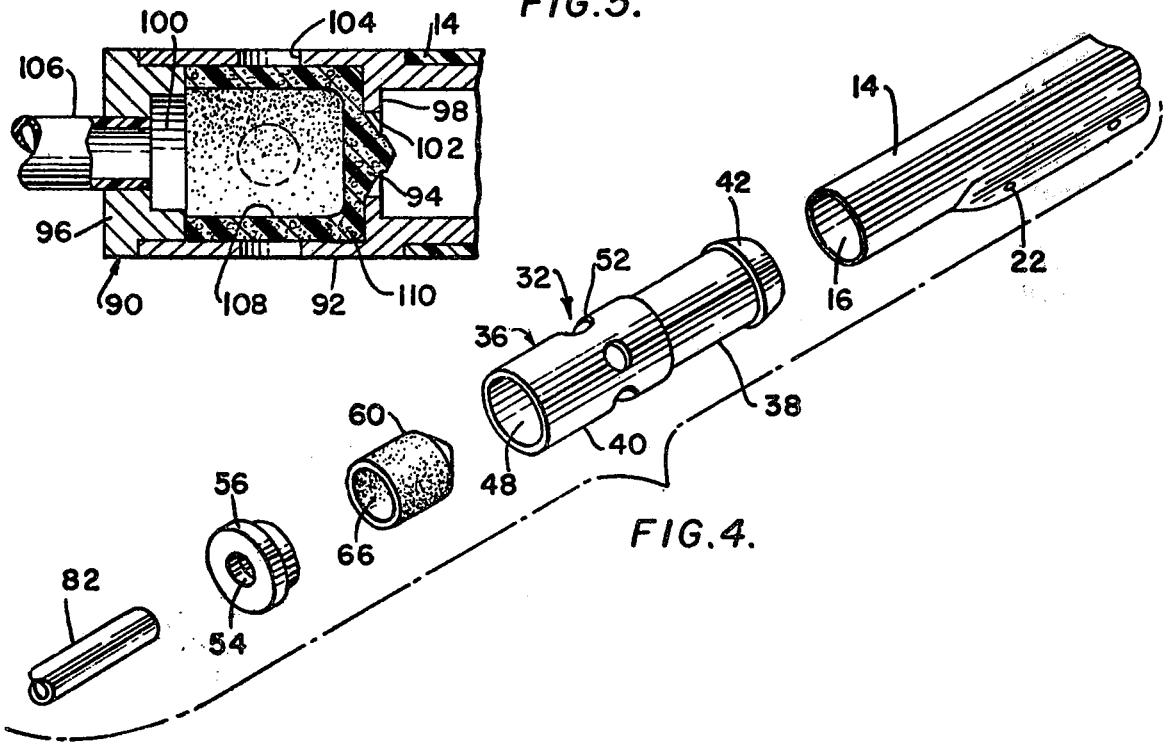

IRRIGATION SYSTEM FLUSHING VALVE

This is a division, of application Ser. No. 522,912, filed Nov. 11, 1974 now U.S. Pat. No. 3,921,905.

BACKGROUND AND OBJECTS OF THE INVENTION

This invention relates to fluid flow control and, more specifically, to systems and techniques for effection a substantially continuous irrigation of crops.

Crop irrigation for many years has been carried out by so-called furrow and sprinkler techniques wherein water is applied to the crops in relatively large doses at prescribed intervals. It will be appreciated that the availability of water in the soil can gradually diminish from one watering to the next. This is an important consideration since most plant roots, especially those of sugarcane plants for example, can undergo considerable stress and strain when attempting to extract moisture from water-deficient soil. It has been found that such strain can adversely affect the ultimate crop yield at harvest.

An irrigation technique which is rapidly gaining wide use among sugarcane growers is the so-called "drip" or "trickle" method which greatly relieves root stress. This technique is carried out by a network of conduits placed adjacently to plant rows. The conduits, which can be laid above or below ground, are provided with tiny openings spaced longitudinally therealong. In practice, water is continuously supplied to the conduits to effect a continuous drip or trickle of water through the openings. Water is thus distributed to the soil in a continuous fashion to eliminate periods where the soil is overly dry. The plants are thereby constantly presented with an ample water supply, as is reflected increased harvest yields.

Among the problems characteristic of drip irrigation techniques is a tendency for the drip openings to become clogged. Such an occurrence is not surprising considering that the size of the opening can run as small as or smaller than 0.51 mm. in diameter. Consequently, the openings are susceptible to being blocked by solids such as soil particles, plant fibers, algae and various micro-organisms characteristic of practically all water sources. Filtering of the water has been found effective in screening out relatively large particles, but particles that are too small to be filtered by present techniques can accumulate around the drip openings and eventually block them.

One measure that has proven successful in preventing clogging by such particle accumulation is the practice of periodically flushing the drip conduits. This is accomplished by opening the remote ends of the drip conduits to allow the water to flow rapidly through the conduits. This high velocity flow tends to scrub away solid accumulations that may have been built-up around the drip openings.

It is common to effect flushing by manual actuation of flushing valves that are attached at the remote ends of the drip conduits. Due to the high number of conduits deployed in a typical crop field, such manual manipulation is not economically efficient.

In an attempt to reduce labor costs, it has been proposed to utilize valves of the pressure responsive type which automatically open upon sensing a change in the water pressure present in the drip conduit. Specific proposals include the suggested employment of valves which open in response to increased water pressure, as well as valves which open in response to reduced water pressure. Both types of valves, however, involve significant shortcomings in the present environment. For example, it is usually very costly to effect an increase in water pressure. On the other hand, flushing by reduced water pressure is not as efficient since the scrubbing action in the drip conduit is less intense.

It is, therefore, an object of the present invention to provide novel methods and apparatus for alleviating or overcoming problems like those previously discussed.

It is another object of the present invention to provide novel methods and apparatus by which both drip irrigation and drip-tube flushing can be conveniently performed under high water pressure conditions.

One other object of the invention is to provide such novel methods and apparatus in which a network of drip tubes are flushed simultaneously by remote control, absent the need for varying pressure in the water distribution lines or for manually opening each drip tube.

A further object of the invention is to provide such novel methods and apparatus which rely solely upon irrigation liquid as a source of actuating power.

A further object of the invention is to provide a novel pressure-responsive sealing valve assembly which is of simplistic construction and highly water resistant.

SUMMARY OF THE INVENTION

In achieving these and other objects, the present invention involves soil irrigating methods and apparatus which utilize a plurality of drip tubes that communicate with a supply of pressurized liquid. The drip tubes each include drip orifices arranged to dispense a substantially continuous flow of liquid to the soil. A plurality of flushing valves are connected to remote ends of the drip tubes. Each flushing valve includes a primary inlet communicating with an associated drip tube, an outlet for discharging liquid from the primary inlet, a pilot opening arranged to introduce pressurized liquid to the valve, and a valve element. The valve element is shiftable to an open position in response to the urgings of pressurized liquid from the primary inlet, to communicate the primary inlet with the outlet. Moreover, the valve element is shiftable to a closed position in response to the urgings of pressurized liquid from the pilot opening, to block communication between the primary inlet and the outlet. A pilot control mechanism is operably connected between the supply of pressurized liquid and the pilot opening. This pilot control mechanism is arranged to conduct pressurized liquid simultaneously to the pilot openings, as well as to simultaneously relieve liquid pressure at these pilot openings. Pressurized liquid that is conducted simultaneously to the pilot openings shifts the valve elements associated therewith to their sealing positions to prevent flushing of the drip tubes. A relieving of liquid pressure simultaneously at the associated pilot openings results in the valve elements being shifted to their open positions in response to urgings of pressurized liquid from the drip tubes, to permit flushing of the drip tubes and effect removal of solid particles therefrom.

In an independently significant aspect of the invention, the flushing valve comprises a chamber having end and side portions. An inlet is formed in one end portion of the chamber. An outlet is formed in the side portion of the chamber. A pilot opening is provided in another end portion of the chamber. Within the chamber there is disposed a valve element formed of a resiliently deformable member. The valve element includes an end wall disposed adjacent the one end portion of the chamber, and a side wall disposed adjacent the side portion of the chamber. The end and side walls of the valve element define an open-ended recess communicating with the pilot opening. The valve element is sufficiently deformable to expand in response to urgings of pressurized fluid from the pilot opening such that the end wall is biased into tight sealing contact with the end portion of the chamber, and the side wall of the valve element expands into sealing engagement with the side portion of the chamber, to seal the primary inlet and the outlets and block fluid communication therebetween. In addition, the valve element is shiftable in response to sufficient urgings of pressurized fluid from the inlet such that the primary inlet and the outlet are placed in fluid communication.

THE DRAWING

Other objects and advantages of the present invention will become apparent from the subsequent detailed description thereof in connection with the accompanying drawings in which like numerals designate like elements, and in which:

FIG. 2 is a longitudinal sectional view of a flushing valve according to the invention, taken along line 2—2 of FIG. 1, with the valve being disposed in a closed position;

FIG. 3 is a view similar to FIG. 2 depicting the valve in an open position;

FIG. 4 is an exploded perspective view of the flushing valve; and

FIG. 5 is a longitudinal sectional view of another preferred flushing valve embodiment.

DETAILED DESCRIPTION OF THE PREFERRED EMBODIMENT

Figure 1:
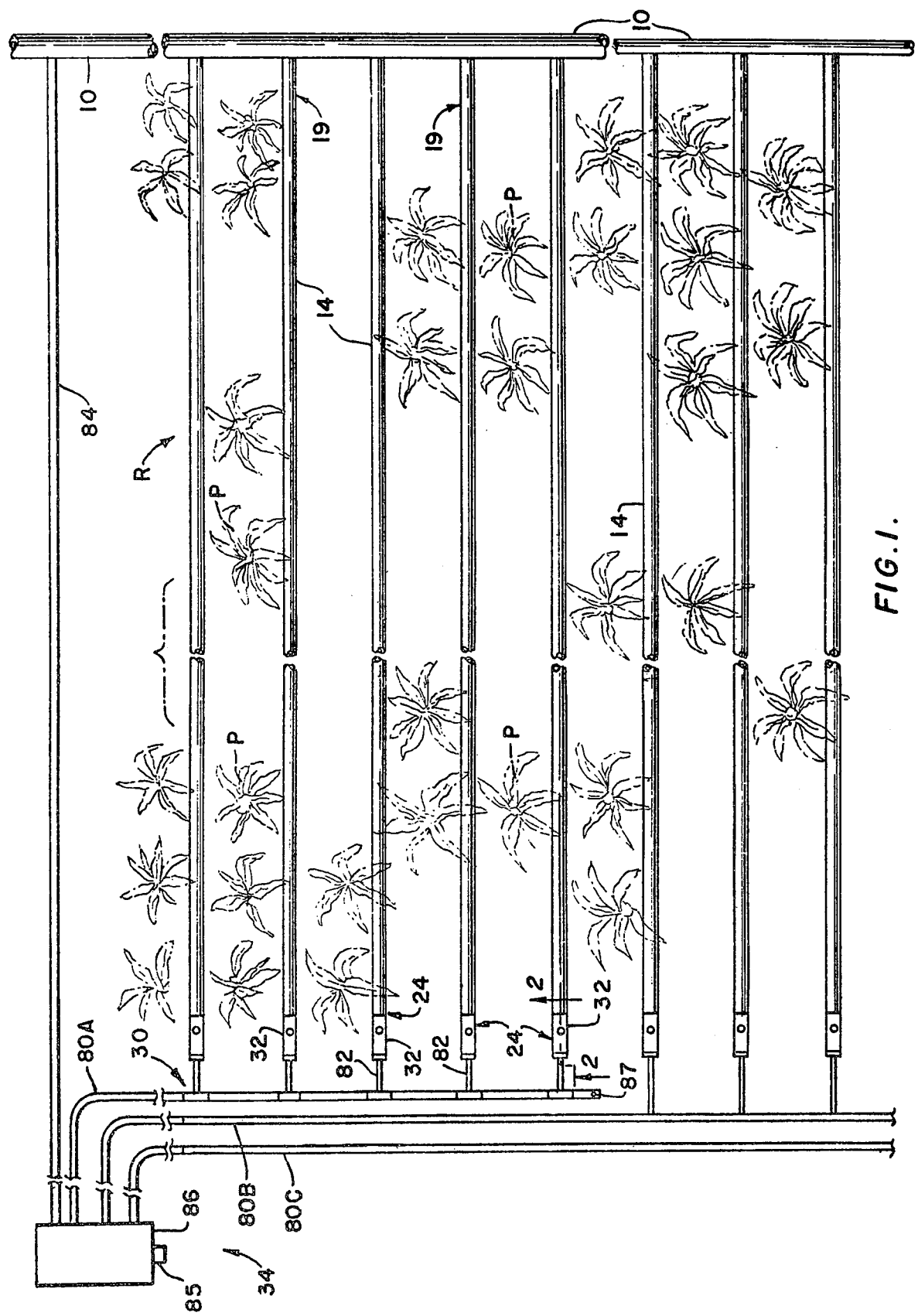
FIG. 1 is a schematic plan view of a drip tube irrigating system in accordance with the present invention.

FIG. 1 schematically depicts, in plan view, a crop irrigation system. The system includes a main distribution line 10 which is connected to a suitable source of pressurized irrigation liquid, such as water. A network of drip tubes 14 emanates from the main distribution line 10 to conduct water along plant rows R which can contain sugarcane plants P, for example. The drip tubes 14 are preferably of the dual-chamber type, although it will be appreciated that other forms of drip tubes could be employed.

As will be apparent from FIG. 2, each drip tube 14 includes a conveyance chamber 16 and a somewhat smaller distribution chamber 18.

The inner ends 19 of the drip tubes 14 are connected to the main distribution line 10 so that the conveyance chamber 16 communicates with the pressurized water source. The conveyance chamber 16 also communicates fluidly with the distribution chamber 18 by means of a series of uniformly spaced feed apertures 20. The distribution chamber, in turn, communicates with the soil via a plurality of drip orifices 22 that are uniformly spaced along the tube, there being more drip orifices than feed apertures. By virtue of the above-described arrangement, water pressure in the conveyance chamber 16 is significantly greater than that in the distribution chamber 18.

During normal phases of irrigation operation, the remote end 24 of each drip tube is sealed and water is supplied under pressure to the conveyance chamber 16. Water traveling through the conveyance chamber 16 is ejected through the feed apertures 20 and into the distribution chamber, from whence it trickles into the soil through the drip apertures 22. Due to the dual-chamber arrangement of the drip tube discussed above, flow rates from the drip orifices 22 are generally uniform throughout the drip tube length, despite the presence of uphill and downhill orientations of the tube.

The feed apertures 20 and the drip orifices 22, due to their extremely small diameter, are very susceptible to clogging by minute solid particles that are present in virtually all water sources. Thus, tiny particles of plant fibers, algae, soil, and other micro-organisms which can be suspended in the water and which are not readily filterable, can accumulate around the feed apertures 20 and the drip orifices 22 and eventually block passage of water therethrough.

These particles settle out in the conveyance tube and, if not flushed out, will not only plug the feed apertures 20 but some of the particles will pass through to the distribution chamber and plug the drip orifices 22. As the velocity is very low in the distribution chamber, the particles essentially become trapped with no practical way of removing them. Hence, it is very important to flush these particles out of the conveyance tube before they get into the distribution tube.

It has been found that periodic flushing of the drip tubes 14, wherein high velocity water flow conditions develop around the feed apertures 20, tends to remove built-up accumulations of solid particles. Also, solids that accumulate in suspension in the water are carried out.

The preferred trickle irrigation system of the present invention includes a flushing sub-system 30 which flushes the drip tubes by remote control and essentially independently of pressure conditions occurring within the drip tubes. This flushing sub-system 30 comprises a plurality of flushing valves 32 that are attached at the remote ends 24 of the drip tubes 14, and a pilot control assembly 34 which actuates the valves.

A preferred form of flushing valve 32 is best illustrated in FIGS. 2–4. The flushing valve 32 includes a housing 36 having an annular stem portion 38 and a main body portion 40. The stem includes an enlarged, beveled edge 42 over which the drip tube 14 can be press-fitted in an essentially leak-proof manner. An annular primary water inlet passage 44 extends through the stem portion 38 and is arranged to communicate with the conveyance chamber 16 of an associated drip tube 14. The main body portion 40 of the housing 36 includes an annular working chamber 46, the side of which being defined by an inner bore surface 48. An annular shoulder 50 defines a forward longitudinal end of the working chamber and separates the primary inlet 44 from the working chamber 46. A plurality of outlet openings 52 are provided in the main body portion 40 of the valve. These outlet openings 52 include inner edges 53 and are communicable with the primary inlet 44 through the working chamber 46.

A pilot opening 54 is provided at the other longitudinal end of the chamber 46 in generally axial alignment with the primary inlet 44. This pilot opening 54 is preferably provided in an end wall 55 of a removable end cap 56 which may be suitably installed in the body portion, e.g. by screw threads or friction, for example.

Disposed within the chamber 46 is a valve element 60. The valve element 60 is of generally cup-shaped configuration and is fabricated of a very pliable material which can be plastic or rubber for example. The material is selected so that the valve element is readily capable of resilient expansion and contraction. More specifically, the valve element 60 includes a head portion 62 disposed opposite the primary water inlet 44, and a cylindrical skirt portion 64 integral with the head portion 62. The skirt portion 64 defines a recess 66 which opens toward the pilot opening 54. The valve element 60 is rather loosely disposed within the chamber 46 and is afforded limited sliding movement within the chamber 46 between a sealing position (FIG. 2) and an open position (FIG. 3).

The head portion 62 of the valve element includes an end wall 68 that is tapered forwardly inwardly to facilitate the creation of a sealing engagement between the end wall 68 and the shoulder 50. The skirt portion 64 includes an outer circumferential side wall 70 that can be expanded into engagement with the bore surface 48 of the valve housing, including the inner edges 53 of the outlet openings 52, as will be later explained in detail.

The valve element is constructed and arranged to assume its closed posture in response to urgings of pressurized water from the pilot opening 54. That is, water pressure from the pilot opening 54 acts within the recess 66 to urge the head portion 62 and its end wall 68 longitudinally forwardly against the shoulder 50 to close the primary inlet 44. Simultaneously, this pressure, acting within the recess 66, elastically expands the skirt portion 64 radially outwardly into tight engagement with the bore surface 48 of the housing to seal the outlet openings (FIG. 2).

In this fashion, a tight multi-location seal is effected to block the flow of water from the primary inlet 44 to the outlet openings 52. During longitudinal sliding movement of the valve element between its open and closed positions, the valve element 60 assumes its relatively loose fit within the chamber 46. Consequently, there will occur only slight frictional contact between the valve element and the valve housing, so as to eliminate the need for sealing rings, as well as to minimize wearing of the valve. The flushing valves 32 are thus relatively long-lasting and essentially service-free in comparison to pilot-operated valves which rely upon a rigid sliding valve element like that of Page et al U.S. Pat. No. 2,619,120, for example.

With the valve element 60 in its closed or sealing posture, water cannot escape from the remote ends of the drip tubes 14, but rather will be forced to exit through the feed apertures 20 and the drip orifices 22 into the soil.

When water pressure from the pilot opening is relieved, the valve will be susceptible to being pushed to an open posture by water pressure from the primary inlet 44. In such an instance, water flows from the primary inlet 44 to the outlet openings 52 so as to flush the drip tube 14. Communication between the primary inlet 44 and the pilot opening 54 will be effectively blocked by sealing engagement between an end surface 74 of the skirt portion and the end wall 55 of the end cap 56. This sealing engagement is effected by pressurized water pushing rearwardly against the head portion 62 of the valve element.

Pressurized water is supplied to the flushing valves 32 by the pilot control assembly 34. The pilot control assembly 34 includes a plurality of pilot manifold conduits 80A, 80B, 80C, each of which is in fluid communication with the pilot openings of a plurality of flushing valves 32. Preferably the drip tubes 14 are divided into groups or blocks, with each block including twenty to thirty drip tubes for example. Each pilot manifold is arranged to supply pilot liquid to an associated block of drip tubes. In this connection, each manifold communicates with the pilot openings 54 of its respective block of drip tubes via pilot lines 82.

While pilot liquid can be supplied to the flushing valves from numerous sources, it is preferable to utilize the pressurized irrigation water which is readily accessible in the field. To accomplish this, the pilot control assembly further includes a feed conduit 84 which fluidly communicates the main water distribution line 10 with a main control valve 86. The control valve 86 is operably connected to the pilot manifolds 80A, B, C to selectively control the distribution of water thereto. The control valve operates under conventional valving principles to alternately connect one or more of the pilot manifolds 80 A, B, C with the feed conduit 84. When a pilot manifold is placed in communication with the feed conduit 84, pressurized water is fed simultaneously to the flushing valves of the block of drip tubes being flushed. This pressurized water acts upon the associated valve elements 60 to urge the valve elements forwardly and radially outwardly. Since pressurized water from the pilot opening 54 engages a greater area of the valve element than does the pressurized water at the primary inlet 44, the pilot water will be operable to extend the valve element into a sealing posture, as previously described.

The main control valve 86 is also arranged to selectively communicate the pilot manifolds 80 A, B, C with a relief or vent passage, such as a conduit 85, so as to relieve pressure at the pilot ends of the associated flushing valves.

The main control valve 86 can be timer operated, if desired, or can be manually actuated, in order to periodically open the flushing valves. In any event, it is desirable that the control valve be arranged to flush the blocks of drip tubes in sequential fashion, rather than all blocks being flushed simultaneously, in order that high water pressure from the main distribution line 10 will be available to effectively flush each drip tube 14. If desired, a pump can be disposed in the feed conduit 84 to augment the pressure of water being supplied to the flush valve pilot openings.

OPERATION

In operation, the drip tubes 14 are deployed in the crop field along the plant rows and are suitably connected at their inner ends to the main water distribution line 10. Flushing valves 32 are disposed at the remote ends of the drip tubes 14 and are each placed in communication with an associated pilot line 82 and pilot manifold 80. The drip tubes can be arranged either on or below the soil surface, as desired, as long as the flush valves are able to freely discharge water from the outlets 52 in unobstructed fashion.

To effect a drip irrigation phase of operation, the control valve 86 is actuated to communicate one or more pilot manifolds, for instance the manifold 80A, with the main water distribution line 10. Pilot water is thus fed simultaneously to the pilot openings of each of the associated flushing valves 32 and acts on the valve element 60. Forces generated by the pilot water within the recess 66 of the valve element are greater than the forces generated by the drip tube water at the head of the valve element. Therefore, the valve element is biased into longitudinal sealing engagement with the primary inlet 44 and into radial sealing engagement with the outlets 52. Consequently, water in the drip tubes is forced to trickle through the feed apertures 20 and the drip orifices 22 into the soil.

When it is desired to flush this block of drip tubes 14, the main control valve 86 is actuated to communicate the manifold 80A with the vent 85. This allows pressure at the pilot end of the flushing valves to be relieved. As a result, pressurized water at the primary inlet 44 will shift the valve element 60 to an open posture, out of sealing engagement with the primary inlet 44 and the outlet openings 52. Water is thereby flushed from the drip tubes 14 at high velocity to establish sufficient turbulence for scouring built-up accumulations from the feed apertures 20. Pressurized water pushing against the head portion 62 of the valve element 60 will cause the skirt portion 64 to expand radially outwardly against the bore housing 48, as well as to push the end surface 74 of the valve element against the wall 55 of the cap 56, to establish a seal between the primary inlet 44 and the pilot opening 54.

When a manifold 80 A, B, C is on a slope, a small orifice 87 is located at the lowest part of the system to serve as a vent. This small orifice could operate continuously at a slow flow rate.

The number of drip tubes being flushed will be selected with a view toward providing ample flushing velocities while allowing the other drip tubes, i.e., those not being flushed, to continue distributing water in an irrigation phase of operation.

When the prescribed flushing period has ended, the main control valve 86 is actuated to recommunicate the manifold 80A with the main water distribution line 10 to shift the valve 32 into a sealing posture. Normal drip irrigation is thereby resumed.

It will be appreciated that if only a single block of drip tubes is being employed in the field, the feed conduit 84 may be utilized as the sole pilot manifold in the system. A control valve could be inserted in this conduit to alternately connect the flushing valves with the main water distribution line and with a vent opening.

In this connection it will be appreciated that each block of drip tubes can be controlled by its own associated feed conduit 84. In such instance, separate valves would be utilized to regulate water flow through the control lines.

As a further alternative arrangement, a drip tube 14 could be suitably valved so as to define a feed conduit 84 for supplying pilot pressure to its respective block of drip tubes.

Another preferred flushing valve embodiment is depicted in FIG. 5. This flushing valve 90 includes a housing 92 which carries a valve element 94 seated between an end cap 96 and a shoulder 98. The valve element 94 is arranged so as to be braced against substantial longitudinal sliding movement within a chamber 100. The valve housing 92 includes a liquid inlet 102 and a plurality of liquid outlets 104. A pilot line 106 supplies pilot liquid to a recess 108 of the valve element to urge the valve element in tight sealing engagement with the shoulder 98 and the wall of the recess 100 to block communication between the inlet and outlet openings.

The valve element 94, being fabricated of highly resilient rubber or plastic material, is capable of contracting longitudinally and radially inwardly at a front end 110 thereof when pilot pressure is relieved and the valve element is subjected only to the force of irrigating liquid from the inlet 102. In this fashion, liquid can pass around the contractably shifted valve element and be exhausted through the outlets 104. Inward contraction of the valve element is, of course, facilitated by the recess 108 into which the sides and front of the valve element can collapse. By virtue of this arrangement, longitudinal sliding movement of the valve element is eliminated, along with the resulting wear problems.

SUMMARY OF MAJOR ADVANTAGES AND SCOPE OF THE INVENTION

The tricle irrigation system of the present invention enables both crop irrigation and drip tube flushing to be conveniently accomplished under high water pressure conditions. There is no need to vary the pressure of the main distribution water to initiate a flushing action, so the maximum available water pressure can be utilized to both irrigate and flush — a significant advantage, especially in areas where water pressure is limited.

Since many drip tubes can be flushed simultaneously by remote control, labor requirements are held to a minimum. Moeover, such remote control is achieved by using water pressure from the main pressurized water source so that extra sources of power are not required. In farm areas where water pressure may be the only available power source, this feature is a distinct advantage.

Also, by controlling selected groups of drip tubes by separate pilot manifolds, one or more groups can be flushed at high pressure, while other groups continue to irrigate.

The flushing valve of the present invention is highly effective in creating a tight fluid seal, via a multi-location sealing contact with inlet and outlet openings. This is accomplished absent the need for a rigid, tight-fitting valve element and the high degree of frictional wear normally accompanying such a valve element.

The alternate embodiment of FIG. 5, wherein sliding movement of the valve element is minimized, resists wearing of the valve element.

Although the invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A springless valve for controlling the discharge of fluid from a conduit, said valve comprising:
    a housing including:
        a longitudinally extending, cylindrically shaped chamber having a cylindrical side wall portion and front and rear end wall portions,
        an inlet opening associated at said front end wall portion of said chamber and being arranged to conduct pressurized fluid from said conduit to said chamber,
        a pilot opening extending though said rear end wall portion of said chamber and being aligned with said inlet opening to conduct pressurized pilot fluid to said chamber, and
        an outlet opening arranged in the side wall portion of said chamber and disposed axially rearwardly and radially outwardly of said inlet opening, to conduct pressurized fluid from said chamber, a valve element slidably disposed in said chamber, said valve element being formed of resiliently deformable material and comprising:
  a head portion disposed opposite said inlet opening, and
  a cylindrical skirt portion integral with said head portion and defining a recess which opens generally rearwardly toward said pilot opening,
    said skirt portion having a cylindrical outer wall free of outward projections and extending from said head portion to the end of the recess and lying generally opposite said cylindrical side wall portion of said housing;
  said valve element being rearwardly slidable in response to urgings of pressurized fluid from said inlet opening to allow passage of fluid from said inlet opening to said outlet opening; and
  said valve element being forwardly slidable and resiliently expandable, in response soley to sufficient urgings of pilot fluid pressure from said pilot opening acting within said recess, such that said head portion extends into sealing engagement with said inlet opening, and said skirt portion expands radially outwardly into direct sealing contact with the edges of said outlet means and with said cylindrical side wall portion, from said outlet openings to the rear end of said recess, to block the flow of fluid from said inlet opening to said outlet opening.

2. A valve according to claim 1 wherein said valve element comprises rubber.

3. A valve according to claim 1 wherein said head portion is flared inwardly toward said inlet opening.

* * * * *